United States Patent
Young (10) Patent No.: US 6,643,522 B1
(45) Date of Patent: Nov. 4, 2003

(54) METHOD AND APPARATUS PROVIDING SIMULTANEOUS DUAL MODE OPERATIONS FOR RADIOS IN THE SHARED SPECTRUM

(75) Inventor: Song-Lin Young, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/536,212

(22) Filed: Mar. 27, 2000

(51) Int. Cl.$^7$ ................................................ H04M 1/00
(52) U.S. Cl. ................ 455/552.1; 455/90.2; 455/422.1; 455/41.2
(58) Field of Search ................................ 455/552, 553, 455/575, 550, 73, 422, 41, 78, 552.1, 90.2, 442.1, 41.2; 370/441, 442, 464, 335, 342, 344, 296, 465; 375/133, 141

(56) References Cited

U.S. PATENT DOCUMENTS

| | | | |
|---|---|---|---|
| 5,390,345 A | | 2/1995 | Wada et al. |
| 5,392,300 A | | 2/1995 | Borth et al. |
| 5,630,224 A | | 5/1997 | Swail |
| 5,710,986 A | | 1/1998 | Obayashi et al. |
| 5,765,113 A | | 6/1998 | Russo et al. |
| 5,794,159 A | * | 8/1998 | Portin ........................ 455/553 |
| 5,884,189 A | | 3/1999 | Yamazaki et al. |
| 6,058,137 A | * | 5/2000 | Partyka ...................... 375/131 |
| 6,108,313 A | * | 8/2000 | Lee et al. ................... 370/294 |

* cited by examiner

Primary Examiner—Edward F. Urban
Assistant Examiner—Sonny Trinh
(74) Attorney, Agent, or Firm—Robert D. Varitz, P.C.

(57) ABSTRACT

A dual mode RF radio includes a first transceiver operating under a first transmitter/receiver protocol, and having a first receiver portion and a first transmitter portion therein; and a second transceiver operating under a second transmitter/receiver protocol, and having a second receiver portion and a second receiver portion therein; wherein both transmitter/receiver protocols are spread spectrum protocols; a shared antenna operatively connected to both said first transceiver and said second transceiver; and an isolation mechanism for isolating said first and second receiver portions from a transmitter portion while said transmitter portion is transmitting. A method of simultaneously operating a dual mode RF radio includes operating a first transceiver under a first transmitter/receiver protocol; operating a second transceiver under a second transmitter/receiver protocol, wherein both transmitter/receiver protocols are spread spectrum protocols; sharing an antenna between the first transceiver and the second transceiver; and isolating the receiver portions of the transceivers from the transmitter portion of the transceivers while a transmitter portion is transmitting, including providing a circulator for connecting the receiver portions and the transmitter portions to the shared antenna.

10 Claims, 6 Drawing Sheets

METHOD AND APPARATUS PROVIDING SIMULTANEOUS DUAL MODE OPERATIONS FOR RADIOS IN THE SHARED SPECTRUM

FIELD OF THE INVENTION

This invention relates to short range wireless communications technologies, such as HomeRF, 802.11 FHSS, and Bluetooth™, and specifically to a method and apparatus to provide a non-desensitizing, non-interfering dual transceiver device for use in such technologies.

BACKGROUND OF THE INVENTION

Many wireless communication systems make use of spread spectrum technologies and operate in the unlicensed industrial, scientific and medical (ISM) band, as regulated by FCC part 15 rules. While all such systems are allowed to use the same frequency band, each has its own air interface, communication protocols, and applications. In the 2.4 GHz ISM band, there are many existing and emerging standards, e.g., 802.11 WLAN, Bluetooth™ and HomeRF. Bluetooth™ is a trademark/service mark of Telefonaktiebolaget LM Ericsson, of Stockholm, Sweden for telecommunication equipment, computer. communication equipment, including radio modems; and telecommunication and computer communication services.

802.11 WLAN products have been around for some time and are mostly used in an office infrastructure. Bluetooth™ and HomeRF, on the other hand, address the needs of cordless cable replacement for portable devices and home networking, respectively. It is not difficult to envision two or more wireless systems co-existing in an office, in a residential area, or even public places. Given the foregoing scenarios, each product must operate in the presence of interference generated by other co-existing systems, and still perform properly. Moreover, it is also desirable from the user's point of view to have only one wireless device, which may be used in various environments, rather than having to carry multiple wireless devices, and to have to change hardware and software configurations, depending on location and the presence of other ISM band devices.

Desensitization is a phenomenon wherein a receiver's sensitivity degrades due to excessive signal strength, which may overload the front-end circuits of the radio. The receiver will be desensitized if there is a second radio operating in close proximity, particularly if the two radios do not transmit in synchronization with each other.

Attempts to solve the problem of dual mode operation in a single transceiver include (1) switching between the two modes, (2) time multiplexing different protocols of frequency bands, or (3) reserving a certain period of time in one mode to allow transmission in another mode. There is no known prior art which provides a solution for simultaneous dual mode operations in the shared spectrum using different transceivers in a single enclosure.

U.S. Pat. No. 5,390,345 to Wada et al. for Method for preventing desensitization and radio interference of radio receivers, granted Feb. 14, 1995, describes a method for using the level of cross modulation from the output of a high frequency amplifier, or mixer, as an indication of severe interference, and which controls the gain of the amplifier, or the attenuation of a variable attenuator preceding the amplifier, to avoid receiver desensitization.

U.S. Pat. No. 5,392,300 to Borth et al., for Dual mode radio communication unit, granted Feb. 21, 1995, describes communication units which are capable of protecting data transmission with encoders/decoders in either error detection or forward error correction modes. A mode selector switch is used for selecting the desired mode of operation.

U.S. Pat. No. 5,630,224 to Swail, for Method and apparatus for avoiding desensitization of a radio frequency receiver, granted May 13, 1997, describes a techniques for avoiding receiver desensitization by changing the frequency being used by a subscriber unit or delaying the data transmission. The detection of interference is achieved by comparing measured BER (bit error rate) vs. expected BER, for RSSI (received signal strength indicator) of the same level.

U.S. Pat. No. 5,710,986 to Obayashi et al., for Dual mode radio communication apparatus having function of selectively designating analog or digital mode, granted Jan. 20, 1998, describes use of a mode designation switch selectively designating analog mode or digital mode.

U.S. Pat. No. 5,765,113 to Russo et al., also entitled Method and apparatus for avoiding desensitization of a radio frequency receiver, granted Jun. 9, 1998, describes techniques for avoiding receiver desensitization.

U.S. Pat. No. 5,884,189 to Yamazaki et al. for Multiple-modes adaptable radiotelephone, granted Mar. 16, 1999 describes a radiotelephone which uses a single wireless transceiver for modulating and demodulating signals in the transmitting/receiving frequency bands for both a cellular telephone system (AMPS) and a cordless telephone system (ISM band). A control unit, which incorporates the software for TIA/EIA/IS-94, is provided to control the wireless transceiver.

The specification of Bluetooth System, Version 1.0 B, December 1999, may be found at bluetooth.com. The specification for HomeRF Shared Wireless Access Protocol (SWAP-CA) Specification Revision 1.2, October. 1999, may be found at http://www.homerf.org.

SUMMARY OF THE INVENTION

A dual mode RF radio includes a first transceiver operating under a first transmitter/receiver protocol, and having a first receiver portion and a first transmitter portion therein; and a second transceiver operating under a second transmitter/receiver protocol, and having a second receiver portion and a second transmitter portion therein; wherein both transmitter/receiver protocols are spread spectrum protocols; a shared antenna operatively connected to both said first transceiver and said second transceiver; and an isolation mechanism for isolating said first and second receiver portions from a transmitter portion while said transmitter portion is transmitting, including a circulator for connecting said receivers and said transmitters to said antenna, a power splitter for splitting a received signal between said first transceiver and said second transceiver, and a power, combiner for combining a transmitted signal from said first transceiver and said second transceiver.

A method of simultaneously operating a dual mode RF radio includes operating a first transceiver under a first transmitter/receiver protocol; operating a second transceiver under a second transmitter/receiver protocol, wherein both transmitter/receiver protocols are spread spectrum protocols; sharing an antenna between the first transceiver and the second transceiver; and isolating the receiver portions of the transceivers from the transmitter portion of the transceivers while a transmitter portion is transmitting, including providing a circulator for connecting the receiver portions and the transmitter portions to the shared antenna.

An object of the invention is to provide a single device which is capable of simultaneous dual mode operations in the same shared frequency spectrum.

Another object of the invention is to provide multiple services for users of different systems.

A further object of the invention is to provide an apparatus and method wherein frequency selection in one system may be used by the other system through a shared backend processor.

This summary and objectives of the invention are provided to enable quick comrprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

The Industrial, Scientific, and Medical (ISM) band has become increasingly crowded, as wireless communication devices proliferate due to unlicensed usage allowed by FCC part 15 regulations. Mandatory use of spread spectrum technology has made it possible for different systems to co-exist and operate in close proximity by controlling the power and time that each system is allowed to occupy the spectrum, and by keeping any interference to a level which is acceptable to all systems in the RF spectrum. Beyond the interference issue, diverse requirements for different mobile users also drive the need for application/service to co-exist.

This invention addresses the problem of simultaneous operations of two co-located radios which use different transmission protocols in a shared RF spectrum. This invention allows a device to include two radio transceivers, each using a different transmission/reception protocol, wherein both transceivers operate at the same time. Either transmitter may transmit any time without desensitizing the receiver of the other radio. A single device is therefore capable of simultaneous dual mode operations in the same spectrum and of providing multiple services for users of different systems. For instance, a HomeRF residential gateway having Bluetooth™ capability may communicate with a Bluetooth™ enabled personal digital assistant (PDA), which may be carried to home from the work place, and which will still allow any proximal networked computers, peripherals, and cordless phones to operate without disruption.

Another advantage for an apparatus implementing the method described in this invention is that the information regarding frequency selection in one system may be used by the other system through a shared backend processor. If a system incorporates the invention described herein, the exact timing of any potential frequency collisions may be determined in advance. Collision avoidance algorithms, although not part of this invention, may be implemented in a more efficient way than would be possible without such knowledge.

This invention provides a method for using two radios in a wireless communication device, such that the device may offer multiple services without compromising the performance of either system incorporated therein. There are two issues which must be resolved: desensitization and collision. These issues need to be considered when two radios co-exist in close proximity and share the same frequency band. As will be explained later herein, desensitization is a system-independent effect and must be resolved in order for a dual system device to operate properly. This invention solves the desensitization problem by combining the front-end circuits of the transceivers in a novel arrangement so that two radios are able to transmit and/or receive their respective signals without coordinating timing for systems of different protocols. Otherwise, the radio will not function properly when the receiver is desensitized due to the co-located radio that is transmitting.

The collision issue arises when there are frequency and time overlaps among systems. The probability of collision in turn is dependent on certain parameters of systems involved. Analysis of collision probability with specific example systems will demonstrate the effectiveness of the method of the invention. Algorithms for completely avoiding interference due to collisions, however, are not within the scope of this invention, and will be well known to those of ordinary skill in the art.

Figure 1:
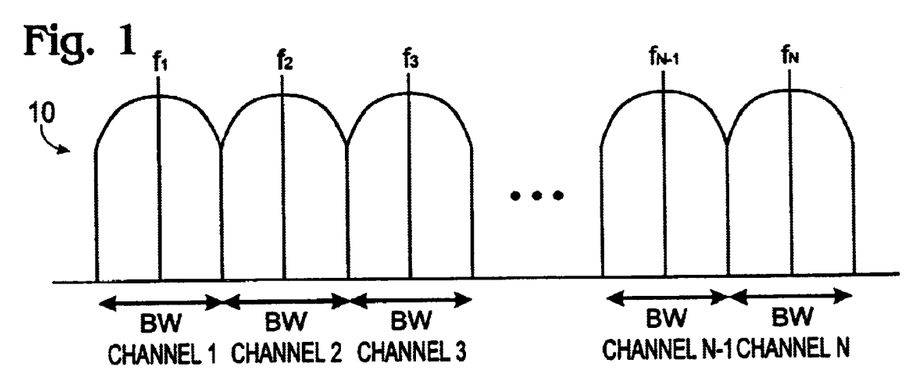
FIG. 1 illustrates channel partitions in a RF spectrum.

Traditionally, an allocated frequency band is divided into channels of equal bandwidth (BW) to allow efficient use of the spectrum, as illustrated generally at 10 in FIG. 1. A signal may occupy only one channel with center frequency, $f_x$, at one time, as illustrated by $f_1, f_2, f_3 \ldots f_{N-1}, f_N$, as assigned by the system controller. The choice of bandwidth for each channel is pertinent to the requirements of an individual system. When a radio is within the range of another radios, operating the same or a different system, interference occurs whenever the radio receives, in addition to desired signal, the signals from the other radio, which may be transmitting at the same time on the same, or on a partially overlapped, channel.

Figure 2:
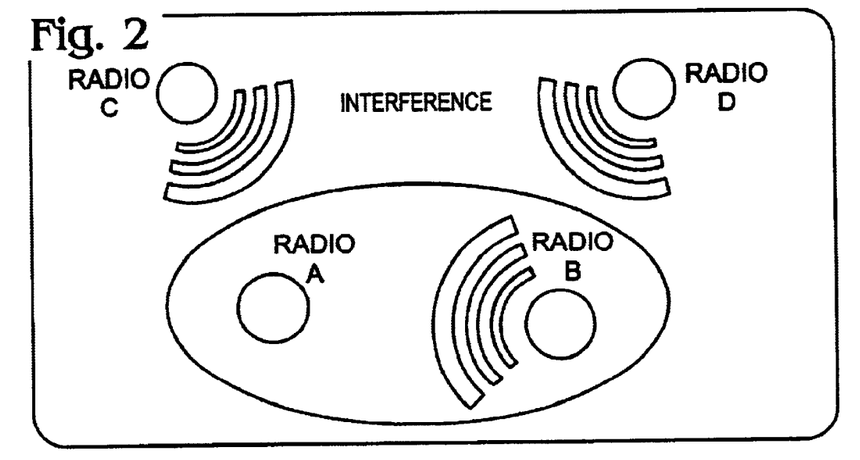
FIG. 2 illustrates interference among communication systems.

Interference, as a result of spectrum sharing, dictates the performance of many wireless communication systems. However, radio spectrum is a limited resource and needs to be shared by as many users as possible. The impacts of interference on system performance is primarily related to the power of desired receiving signal relative to that of the interference producing radio. For instance, in FIG. 2, radio A and radio B communicate with each other in their system, referred to herein as a first system, while radio C and radio D transmit within their system, referred to herein as a second system. The receiving capability of A is determined by the ratio of signal strength received:

$$\frac{C_B}{I_C + I_D} \qquad \text{Eq. 1}$$

Where $C_B$ is the desired carrier power transmitted by B and $I_C, I_D$ indicate interfering power from C and D, respectively. C and D may have different bandwidth from that of A and B. It should also be noted that they may interfere with A even if they are using a carrier frequency proximal to that used by A, vice using exactly the same carrier frequency. Depending on the transmitting characteristics of the interferers, any unwanted energy that enters a receiver's pass band may contribute to interference. The issue of co-channel and adjacent-channel interference will be discussed in more details later herein.

Receiver Desensitization

According to Eq. 1, the ratio of carrier power to interference power determines the ultimate performance of a receiver. Increasing the distance between a receiver and an undesired signal source may mitigate the impacts of interference. On the other hand, interference becomes more severe when the distance between the radios is decreased. When one radio is placed in proximity of another, the receiver may be overloaded due to transmission of the other radio. This condition is known as desensitization, and occurs regardless of carrier frequency spacing. Desensitization results because the front-end circuits of receivers have limited power-handling capability. If the total power entering the front-end circuit exceeds a certain threshold, the receiver will not function properly.

Figure 3:
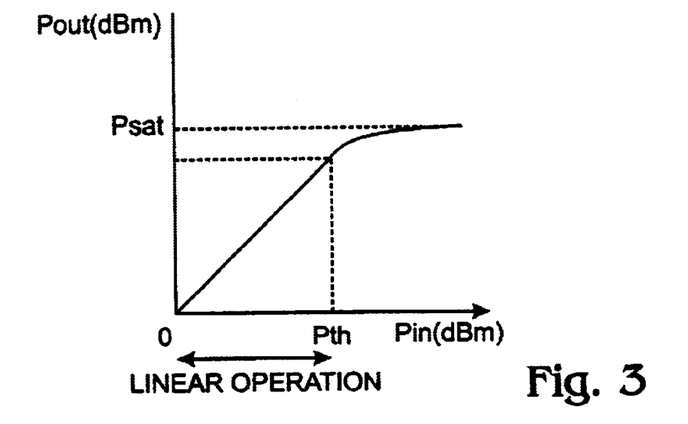
FIG. 3 depicts the power input/output of a receiver.

FIG. 3 illustrates the power input/output relation of a typical receiver. In a linear operation region, where $P_{in}$ is less than $P_{th}$, each dB of $P_{in}$ increment results in one dB increment of $P_{out}$. However, when $P_{in}$ exceeds $P_{th}$, this relation no longer holds, and $P_{out}$ eventually saturates at the level $P_{sat}$. In this situation, the receiver's performance will degrade. It should be noted that the total power input to the receiver determines the operation point of a receiver. Therefore, the wanted signal as well as any other signals in the pass band needs to be considered when calculating $P_{in}$.

Figure 4:
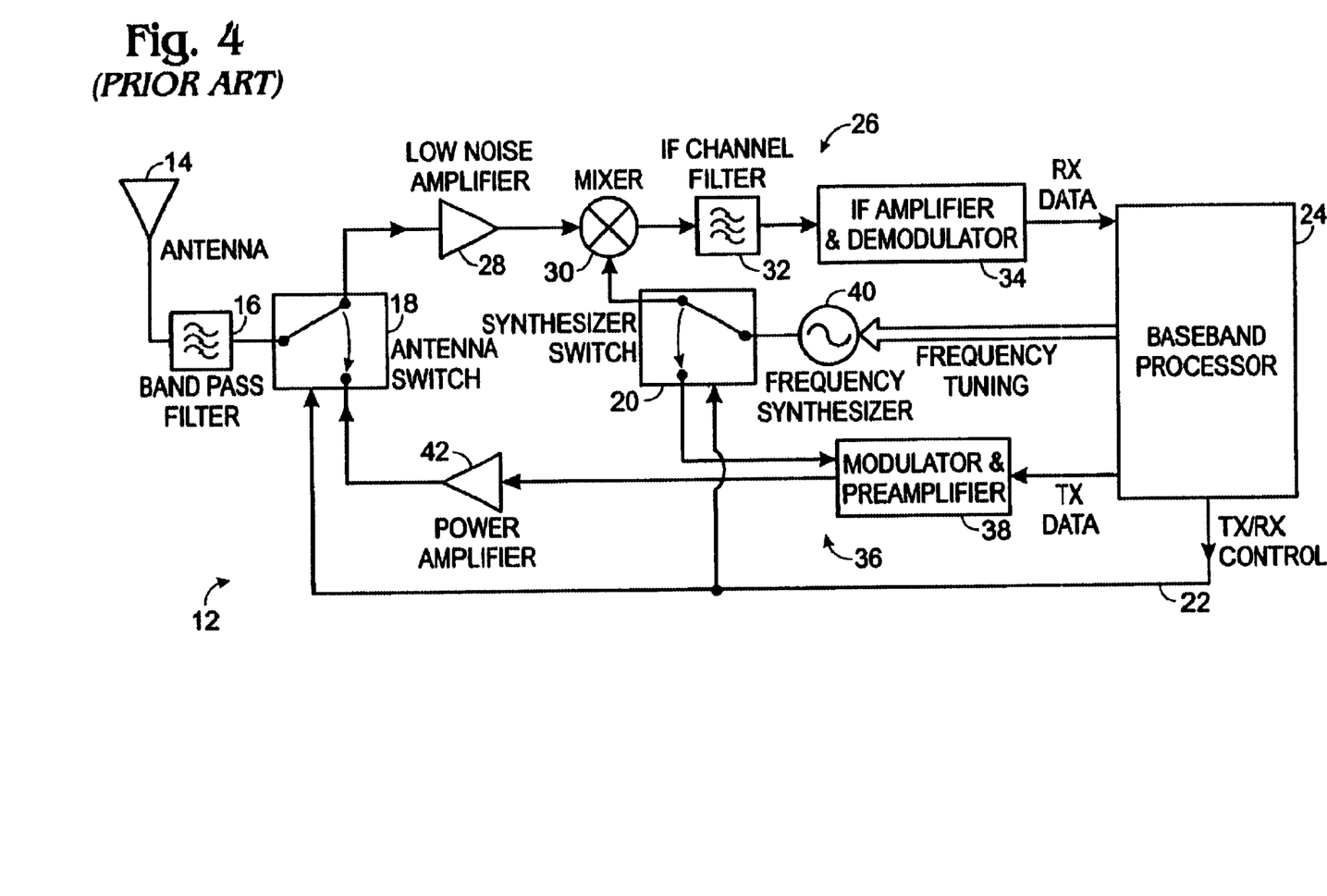
FIG. 4 is a block diagram of a typical radio transceiver.

A generic transceiver front-end circuit of a time division duplex (TDD) radio is depicted generally at 12 in FIG. 4. Transceiver 12 includes an antenna 14 and a band pass filter 16, and is either in a transmitting mode or a receiving mode, according to the setting of an antenna switch 18 and a synthesizer switch 20, which are both controlled by a TX/RX control signal 22 from a baseband processor 24. During a receiving period, any signals picked up by the antenna will be processed by a receiver chain 26, which includes band pass filter 16, a low noise amplifier 28, a mixer 30, an IF channel filter 32, and an IF amplifier/demodulator 34.

While the selection of desired signal is dependent on IF channel filter 32 to block all unwanted output from the mixer circuit, all the blocks in receiver chain 26 preceding the channel filter respond. to all signals in the whole pass band. A transmitter chain 36 includes a modulator/preamplifier 38, a frequency-synthesizer 40 and a power amplifier 42.

If the aggregate signal power from interference exceeds the maximum power level, $P_{th}$ in FIG. 3, at which the low noise amplifier or mixer are designed to operate, the receiver sensitivity will be degraded even though the wanted signal has a power level in the normal dynamic range. As a result, desensitization will affect the coverage of a wireless system, or completely prevent the receiver from functioning properly if excessive interference persists for an extended period of time. Therefore, any strong signal in the pass band, which does not occupy the same channel, may be a threat to the receiver.

Transceiver Front End Circuit for Co-located Radios

Figure 5:
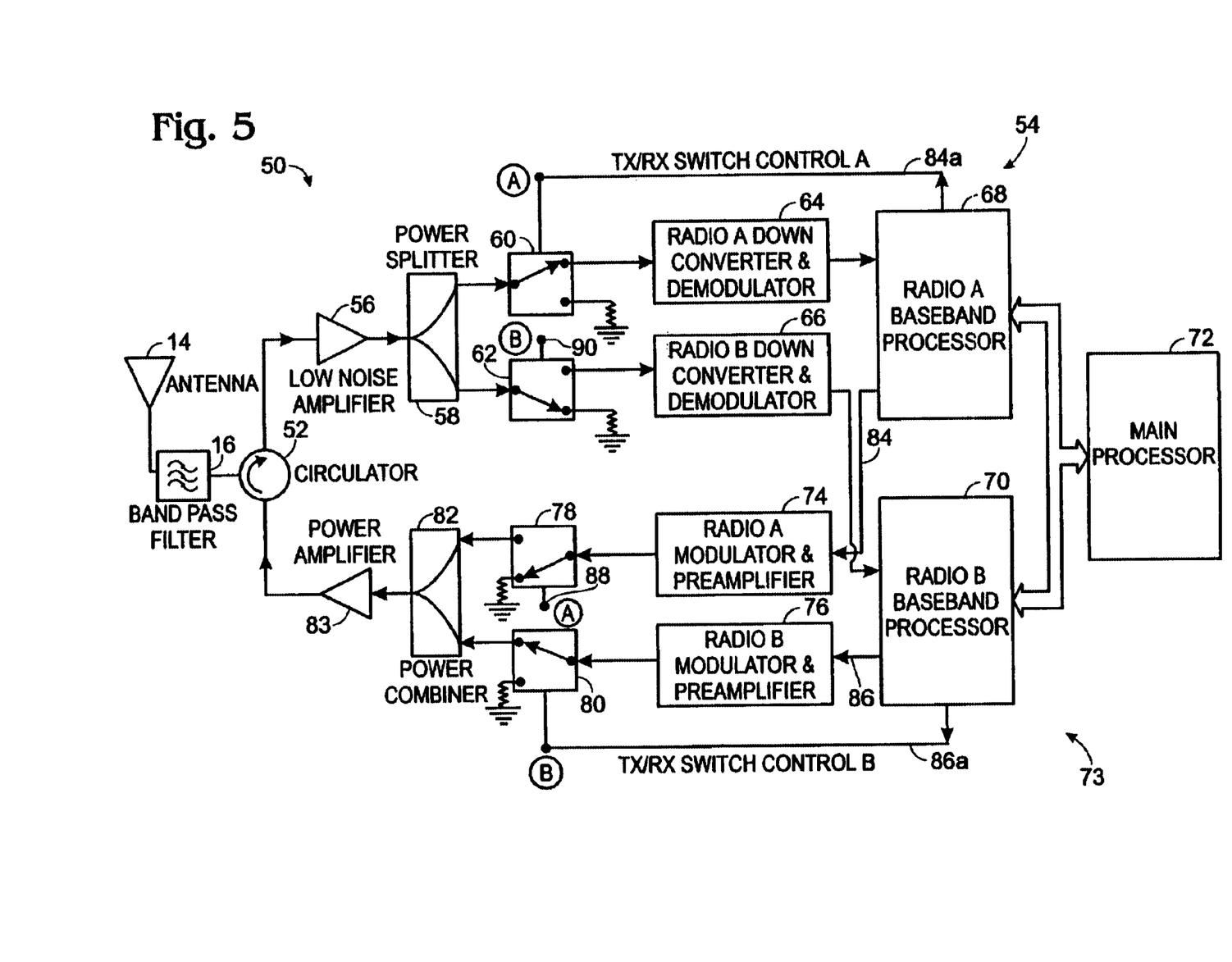
FIG. 5 is a block diagram of a radio architecture of the invention.

In order to solve the desensitization problem, a novel front-end circuit configuration is provided. FIG. 5 depicts the architecture of a wireless device, or transceiver, 50, which incorporates two radios A, B, of different air interfaces. Instead of using a switch, as in transceiver 12 of FIG. 4, a circulator 52 is provided. Other components of transceiver 50 include, in a receive chain 54, a low pass amplifier 56, and a power splitter 58, which divides an incoming signal into portions for Radio A and Radio B. Following power splitter 58, the signal proceeds along a divided receive chain for each radio, initially passing through transmit/receiver (Tx/Rx) switches 60, 62, and a down converter/demodulator 64, 66, for Radios A and B, respectively. Baseband processors 68, 70 are provided for each radio. A main processor 72 connects the two radios to the remainder of the transceiver functions.

A transmit chain 73 includes, for Radios A and B, respectively, a modulator and preamplifier, 74, 76, Tx/Rx switches 78, 80, a power combiner 82 and a power amplifier 83, which is connected to circulator 52.

Circulator 52 connects power amplifier 83, low noise amplifier 56, antenna 14 and band pass filter 16, providing isolation between receive chain 54 and transmit chain 73. A circulator is a 3-port device formed by a symmetrical Y junction coupled to magnetically biased ferrite material. It should be noted that circulators are used in prior art cellular base stations for cascading power amplifiers of different channels to share the antennas. The circulator, as used in this invention, permits flow of signal power in one direction only, e.g. from port 1 to port 2, from port 2 to port 3, and from port 3 to port 1. Isolation is defined as the power loss when signal travels in the reverse direction, e.g., from 1 to 3,3 to 2, and 2 to 1.

In transceiver 50, output power from the transmitter power amplifier is directed to the antenna. None, or very little power, may pass through the circulator and reach the port connected to the receiver low noise amplifier. However, the signals received by the antenna will reach the receiver, port with virtually no loss.

In transceiver 50, both radio A and radio B baseband processors 68, 70 generate modulator/preamplifier control signals 84, 86 for turning their respective modulators and demodulators on and off. The outputs of these modulators are combined by power combiner 82 before being fed to the final stage power amplifier 83. Unused outputs, e.g., during receiving mode, are terminated by the corresponding dummy loads 88, 90 with the control signals changing the state of Tx/Rx switches. Similarly, the same set of control signals, 84a, 86a, select whether or not the output of the power splitter is connected to the demodulator for further processing. Power splitter 58 divides the signal from low noise amplifier 56 into halves so that each system may receive the necessary signal. An isolation mechanism includes circulator 52, low noise amplifier 56 and power amplifier 83, power splitter 58 and power combiner 82, as well as the control signals from baseband processors 68, 70, and Tx/Rx switches 60, 62, 78 and 80.

The circuit described herein enables two transceivers to be co-located in the same enclosure. Instead of using one antenna for each radio, which may result in desensitization of the receiver, a circulator is used to allow sharing of one front-end by both radios. Furthermore, the circulator isolates the transmitter power, keeping the transmitter power from passing through either receiver circuit, which would likely cause the receiver circuit to function improperly, or which may even permanently damaging the receiver circuit.

The effectiveness of this invention dependent on the isolation property of the circulator. However, infinite isolation does not exist in reality. For example, a commercially available, single-junction circulator may have 30 dB of isolation over the entire 2.4 GHZ ISM band. To achieve higher isolation, two such components may be cascaded in one package to provide 50 dB of isolation. One such commercially available circulator is that produced by Nova Microwave, Part No. 0245CHS (.novamicro.com).

As previously noted, there are two emerging industry specifications: Bluetooth™, and HomeRF, which are used in the description of the operation of this invention. Table 1 provides the pertinent system parameters for these two specifications:

TABLE 1

Radio Characteristics of Bluetooth and HomeRF

|  | Bluetooth ™ | HomeRF |
|---|---|---|
| Frequency range | 2.4–2.483 GHz | 2.4–2.483 GHz |
| No. of channels | 79 | 75 |
| Channel bandwidth | 1 MHz | 1 MHz |
| Hopping rate | 1600 hop/sec | 50 hops/sec |
| Output power | 20 dBm/4 dBm/0 dBm | 20 dBm/0 dBm |
| Max. useable input level | >= −20 dBm | >= −20 dBm |
| Modulation | GFSK (BT = 0.5) | GFSK/4GFSK (BT = 5) |
| Bit rate | 1 Mbps | 800 kbps/1.6 Mbps |
| Sensitivity | −70 dBm | −80 dBm/−70 dBm |

From Table 1, it may be seen that both specifications require the maximum useable input level to be as low as −20 dBm. To guarantee that a receiver is free from desensitization, it is necessary to keep any unwanted in band signals 10 dB below the maximum useable input level, i.e., −30 dBm for both Bluetooth™ and HomeRF. It is apparent that 50 dB of isolation, as provided by the circulator of FIG. 5, will satisfy this requirement, as the maximum output power is 20 dBm, in the worst case scenario.

Interference

Figure 6:
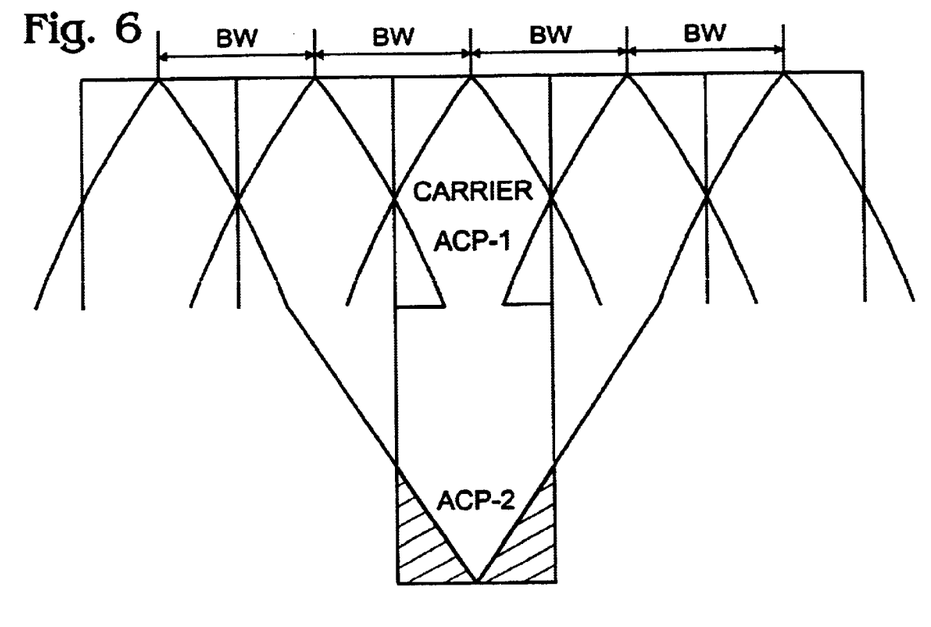
FIG. 6 depicts adjacent channel interference.

In addition to desensitization, interference also affects performance of the systems. As discussed previously, interference occurs whenever there is signal overlap in both time and spectrum. In particular, the spectrum of a transmitter is not always confined to one channel, as shown in FIG. 1. Pulse shaping, modulation schemes, and unperfected power amplification are among the most important factors which contribute to the spreading of the spectrum outside of the assigned channel. The impacts of non-ideal spectrum spreading may be assessed by the amount of adjacent-channel interference (ACI), as illustrated in FIG. 6, where ACP-1 and ACP-2 designate signals that are separated by one and two channels away from the wanted signal, respectively. The hatched regions indicate power transmitted by signals on adjacent channels, which have encroached into the channel of the wanted signal.

As described earlier, a receiver front-end circuit may not distinguish between individual in-band signals. Therefore, a portion of the power from the interfering signals will pass through the IF channel filter and enter the demodulator section, together with the wanted signal. This will eventually degrade the sensitivity of the receiver.

Another source of interference is the undesired signals that are transmitted on the same channel as that used by the wanted signal. Co-channel interference (CCI) refers to this type of interference. CCI will produce similar, or even worse, effects on the receiver as that of ACI.

Power-ratio-of-carrier to all interference (C/I) is a parameter used for determining receiver performance. For example, frequency shift keying (FSK) type demodulators used by Bluetooth™ and HomeRF require a C/N>11 dB for proper operation. In the following analysis, this criterion (C/N>11 dB) is used with the Gaussian FSK (GFSK) modulation spectrum to determine the number of adjacent channels which will affect the receiver.

Figure 7:
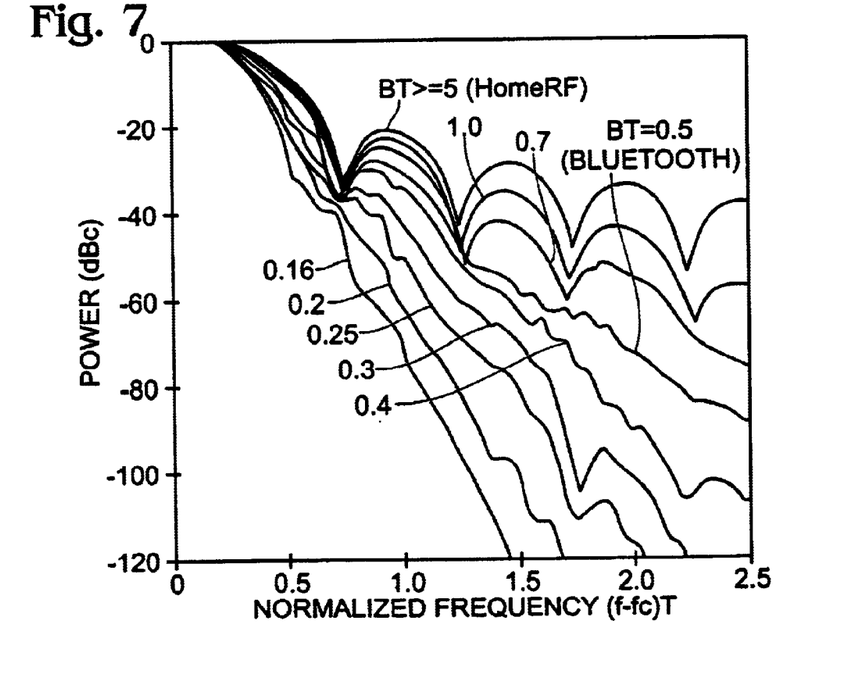
FIG. 7 depicts the GFSK power spectrum.

Having avoided desensitization using the circuit of FIG. 5, it is also necessary to ensure that the interference level stays below required threshold. A series of transmitter power spectrum for GFSK modulation, which are used by both Bluetooth™ and HomeRF (Table 1), of different Bluetooth™ products are shown in FIG. 7; BT indicates normalized 3 dB bandwidth of the Gaussian low pass filter for pulse shaping. Bluetooth™ uses the BT=0.5 Gaussian filter. HomeRF uses the BT=5 filter, which has little effect on pulse shaping. As may be seen in FIG. 7, while all the curves spread beyond one channel bandwidth, when normalized frequency=1, and contribute to adjacent channel interference, the curve for Bluetooth™ spectrum(BT=0.5) rolls off much more rapidly than that of the curve for HomeRF (BT=5).

With the data in Table 1, the C/I ratios of a HomeRF receiver may therefore be calculated vs. a high power Bluetooth™ device transmitting on co-channel and adjacent channels. Table 2 lists the resulting C/I ratios up to the fifth adjacent channel. Power levels of the adjacent channel interference (ACI) are derived from relative values in FIG. 7, assuming a 20 dBm Bluetooth™ transmitter. It may be seen that despite the 50 db isolation provided by the circulator, it is not enough isolation to bring down CCI and ACI-1 to a level where the receiver meets the required C/I ratio, >11 dB. However, HomeRF receivers will have C/I ratios greater than 20 dB and will be virtually free from interference if the Bluetooth™ transceiver is transmitting at frequencies separated by at least two channels, i.e., 2nd adjacent channel and up. Therefore, among the 79 available channels for Bluetooth™, there are three channels, the carrier and the two 1st adjacent frequencies, which will interfere with a HomeRF receiver if a system is implemented with the radio architecture of this invention.

TABLE 2

Interference from a co-located Bluetooth radio

| | Bluetooth interference (dBm) | Isolation (dB) | Interference at receiver (dBm) | HomeRF Receiver sensitivity (dBm) | C/I (dB) | C/I > 11 dB |
|---|---|---|---|---|---|---|
| Co-channel | 20 | 50 | −30 | −80 | −50 | No |
| 1st adjacent channel | −10 | 50 | −60 | −80 | −20 | No |
| 2nd adjacent channel | −50 | 50 | −100 | −80 | 20 | Yes |
| 3rd adjacent channel | <−70 | 50 | <−120 | −80 | >40 | Yes |
| 4th adjacent channel | <−70 | 50 | <−120 | −80 | >40 | Yes |
| 5th adjacent channel | <−70 | 50 | <−120 | −80 | >40 | Yes |

The interference from a HomeRF transmitter may be similarly analyzed. The C/I ratios for each adjacent channel are shown in Table 3. The 5th adjacent channel in Table 3 meets the requirement of C/I>11 dB. A Bluetooth™ receiver will be interfered with by a co-located HomeRF transceiver if the HomeRF transceiver is using any of the nine frequencies, including the Bluetooth™ carrier frequency as well as adjacent channels, up to the 4th adjacent channel, on both sides of the carrier. Frequencies separated by at least five channels will not produce interference.

TABLE 3

Interference from a co-located HomeRF radio

| | HomeRF interference (dBm) | Isolation (dB) | Interference at receiver (dBm) | Bluetooth Receiver sensitivity (dBm) | C/I (dB) | C/I > 11 dB |
|---|---|---|---|---|---|---|
| Co-channel | 20 | 50 | −30 | −70 | −40 | No |
| 1st adjacent channel | −4 | 50 | −54 | −70 | −16 | No |
| 2nd adjacent channel | −16 | 50 | −66 | −70 | −4 | No |
| 3rd adjacent channel | −24 | 50 | −74 | −70 | 4 | No |
| 4th adjacent channel | −28 | 50 | −78 | −70 | 8 | No |
| 5th adjacent channel | −33 | 50 | −83 | −70 | 13 | Yes |

Probability of Collisions

Figure 8:
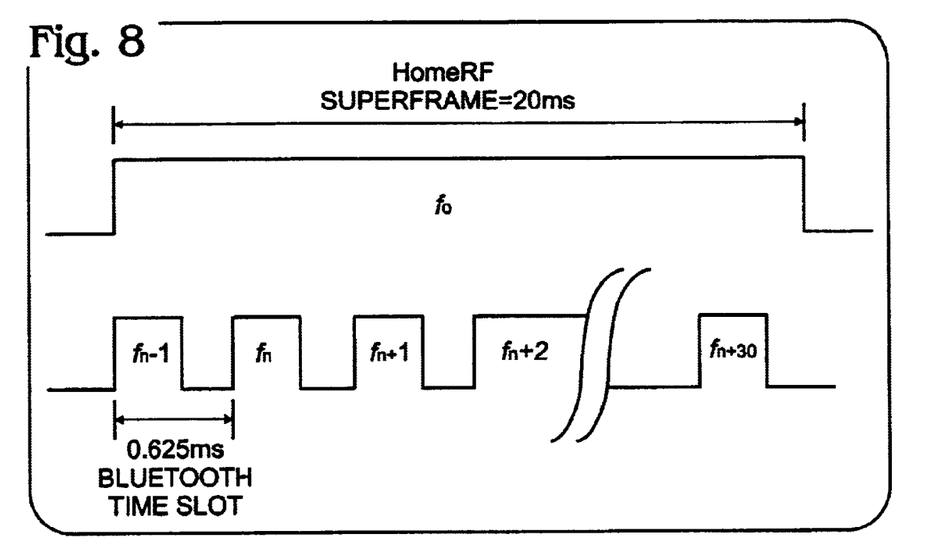
FIG. 8 depicts frame timing of Bluetooth™ and HomeRF systems.
Figure 9:
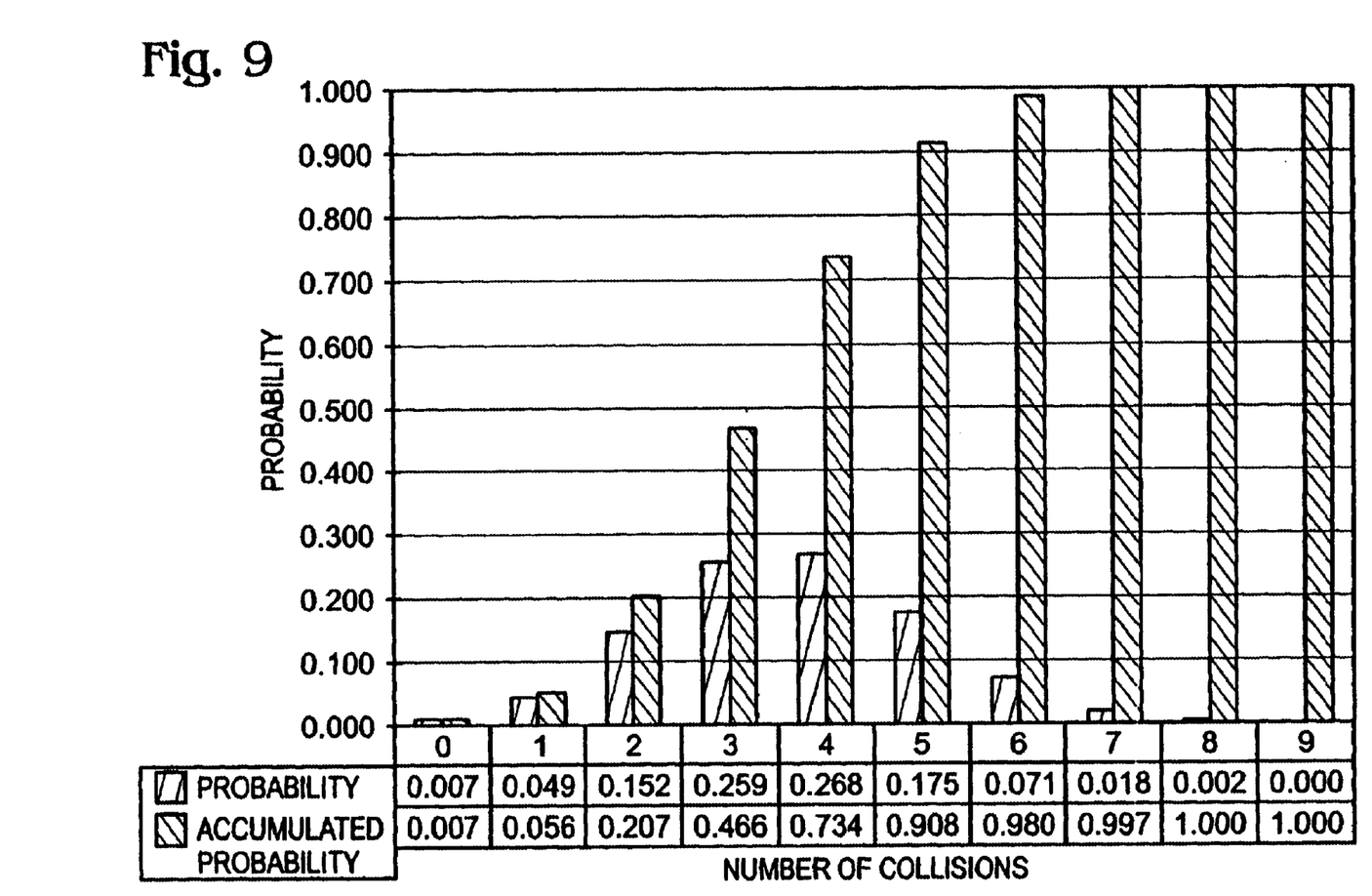
FIG. 9 depicts the probability of collision from HomeRF interference.

Knowing the number of adjacent channels which will contribute to the interference in the dual radio transceiver of the invention, the probability of collision between two systems due to co-channel or adjacent frequency may be determined. The frame timing of Bluetooth™ and HomeRF is shown in FIG. 8. The superframe of HomeRF is 20 ms long. Bluetooth™ hops every 0.625 ms, for 1600 hops/sec. Therefore the frequency of Bluetooth™ changes 32 times during each HomeRF superframe. Assuming that Bluetooth™ hops over the 79 available frequencies in a pseudo-random manner, and is interfered with by a HomeRF transceiver in any time slot that uses a frequency near the HomeRF carrier, and within four channels thereof, the probability of collision is shown in FIG. 9. While the probability of no collision, N=0, is less than one percent, the average number of time slots in collision in each HomeRF superframe is 3.65. FIG. 9 also shows the accumulated probability distribution of number for time slots in collision. The probability for the number of collisions no more than five is greater than ninety percent. Therefore, the average loss of Bluetooth™ throughput due to a co-located HomeRF radio is $3.65/32=11.4\%$, and less than $5/32=15.6\%$ ninety percent of the time.

Figure 10:
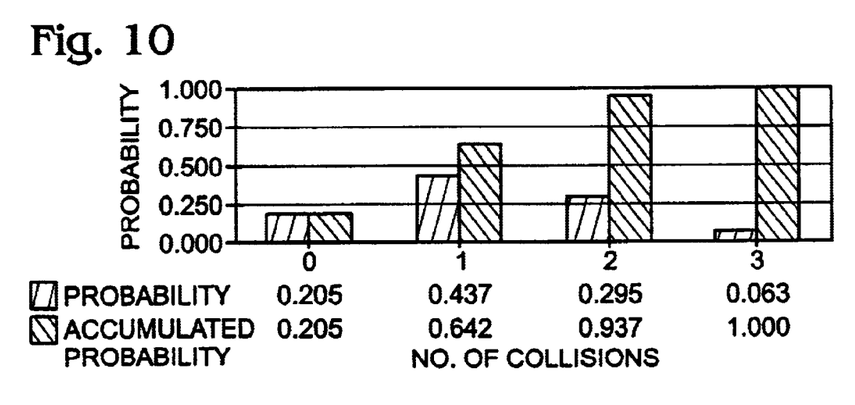
FIG. 10 depicts the probability of collision from Bluetooth interference.

The impact on HomeRF receiver performance from Bluetooth™ interference may be similarly determined, and the results are shown in FIG. 10. The average collision occurrence is 1.22 and no more than two collisions 93.7 percent of the time. The period of time in one HomeRF superframe being interfered with is therefore less than $2/32=6.25$ percent, in most cases.

With desensitization solved in accordance with the invention the performance of a dual radio system constructed according to the invention is solely dependent on the probability of collision due to co-channel and adjacent channels. Table 4 summarize above results:

TABLE 4

Degradation of Performance Due to Interference

| | Bluetooth performance degradation due to HomeRF interference | HomeRF performance degradation due to Bluetooth interference |
|---|---|---|
| Average | 11.4% throughput reduction | 3.8% (1.22/32) of time interfered in one superframe |
| Probability > 90% | less than 15.6% throughput reduction | less than 6.25% (2/32) of time being interfered in one superframe |

Without the circuit of the invention, the loss of throughput is almost 100 percent, due to desensitization. The improvement achieved with this invention is therefore more than eighty percent for Bluetooth™ and ninety percent for HomeRF.

Software algorithms, which are not part of this invention, are required to completely avoid the co-channel and adjacent channel interference. However, a system using the circuit of this invention may provide necessary information for implementing such collision avoidance algorithms. For example, the main processor in FIG. 5 may exchange the timing and frequency hopping sequence between two radios so that one of them may purposely avoid the channel that is being used by the other. Such an embodiment will include a switching mechanism for delaying or otherwise changing the transmission characteristics of one of the transceivers.

This invention may be readily adapted to any two wireless communication systems, which employ time division duplex scheme, e.g., Bluetooth™ and 802.11 WLAN, direct sequence or frequency hopping, dual mode devices. Algorithms for avoiding interference may Also make use of this invention as exact timing and frequency allocation information for both systems are available.

Thus, a method and system for providing simultaneous dual mode operations for radios in the shared spectrum has been disclosed. It will be appreciated that further variations and modifications thereof may be made within the scope of the invention as defined in the appended claims.

I claim:

1. A dual mode RF radio comprising:
   a first transceiver operating under a first transmitter/receiver protocol in an RF band, and having a first receiver portion and a first transmitter portion therein; and a second transceiver operating under a second transmitter/receiver protocol in the same RF band as the first transmitter/receiver, and having a second receiver portion and a second transmitter portion therein; wherein both transmitter/receiver protocols are time division duplex protocols having non-synchronous transmissions;
   a shared antenna operatively connected to both said first transceiver and said second transceiver; and
   an isolation mechanism for isolating said first and second receiver portions from a transmitter portion while said transmitter portion is transmitting to reduce desensitization.

2. The radio of claim 1 wherein said isolation mechanism includes a circulator for connecting said receivers and said transmitters to said antenna, a power splitter for splitting a received signal between said first transceiver and said second transceiver, and a power combiner for combining a transmitted signal from said first transceiver and said second transceiver.

3. The radio of claim 1 which further includes a main processor operatively connected to both transceivers and a collision avoidance mechanism for determining which of the frequencies in the spectrum will be used by each of said transceivers for a next transmission.

4. The radio of claim 3 wherein said collision avoidance mechanism includes a collision avoidance algorithm and a switching mechanism for avoiding the channel that is being used by the other transceiver.

5. A dual mode RF radio comprising:

a first transceiver operating under a first transmitter/receiver protocol in an RF band, and having a first receiver portion and a first transmitter portion therein; and a second transceiver operating under a second transmitter/receiver protocol in the same RF band as the first transmitter/receiver, and having a second receiver portion and a second transmitter portion therein; wherein both transmitter/receiver protocols are time division duplex protocols having non-synchronous transmissions;

a shared antenna operatively connected to both said first transceiver and said second transceiver;

a main processor operatively connected to both transceivers and a collision avoidance mechanism for determining which of the frequencies in the spread spectrum will be used by each of said transceivers for a next transmission; and an isolation mechanism for isolating said first and second receiver portions from a transmitter portion while said transmitter portion is transmitting to reduce desensitization.

6. The radio of claim 5 herein said isolation mechanism includes a circulator for connecting said receivers and said transmitters to said antenna, a power splitter for splitting a received signal between said first transceiver and said second transceiver, and a power combiner for combining a transmitted signal from said first transceiver and said second transceiver.

7. The radio of claim 5 wherein said collision avoidance mechanism includes a collision avoidance algorithm and a switching mechanism for avoiding the channel that is being used by the other transceiver.

8. A method of simultaneously operating a dual mode RF radio comprising:

operating a first transceiver under a first transmitter/receiver protocol in an RF band;

operating a second transceiver under a second transmitter/receiver protocol in the RF band, wherein both transmitter/receiver protocols are time division duplex protocols having non-synchronous transmissions;

sharing an antenna between the first transceiver and the second transceiver; and isolating the receiver portions of the transceivers from the transmitter portion of the transceivers while a transmitter portion is transmitting to reduce desensitization.

9. The method of claim 8 which further includes providing a circulator for connecting the receiver portions and the transmitter portions to the shared antenna.

10. The method of claim 8 which further includes avoiding collisions on a same channel frequency between the transmitter portions of the two transceivers by determining which of the frequencies in the spectrum will be used by each of said transceivers for a next transmission and switching one of the transmitter portions to another channel.

* * * * *